(12) United States Patent
Klopfenstein

(10) Patent No.: US 11,655,936 B2
(45) Date of Patent: May 23, 2023

(54) SUPPORT DEVICE FOR THE REMOVABLE ATTACHMENT THEREOF TO A WOODEN OBJECT

(71) Applicant: Jack Klopfenstein, Brodhead, WI (US)

(72) Inventor: Jack Klopfenstein, Brodhead, WI (US)

( * ) Notice: Subject to any disclaimer, the term of this patent is extended or adjusted under 35 U.S.C. 154(b) by 0 days.

(21) Appl. No.: 17/246,602

(22) Filed: May 1, 2021

(65) Prior Publication Data
US 2023/0107767 A1 Apr. 6, 2023

(51) Int. Cl.
*F16M 13/00* (2006.01)
*F16M 13/02* (2006.01)

(52) U.S. Cl.
CPC ................... *F16M 13/022* (2013.01)

(58) Field of Classification Search
CPC .................................... F16M 13/022
See application file for complete search history.

(56) References Cited

U.S. PATENT DOCUMENTS 4,325,529 A * 4/1982 Seebinger ............. F16M 13/022
248/219.4
4,409,907 A * 10/1983 Norton ..................... A47B 5/02
248/230.8

(Continued)

*Primary Examiner* — Amy J. Sterling
(74) *Attorney, Agent, or Firm* — David J. Archer

(57) ABSTRACT

A supporting device is disclosed for the removable attachment thereof to a wooden object such as a tree trunk that avoids the insertion into the wooden object of a metallic fastener that could later damage machinery used while processing the wooden object. The supporting device includes a support plate having a first face and a second face and a first and a second edge. The support plate defines a plurality of apertures, each aperture of the plurality of apertures extending between the first and the second face of the support plate. A plurality of legs are provided with each leg having a first and a second extremity. Each leg threadably cooperates with a corresponding aperture of the plurality of apertures. A plurality of feet are provided with each foot being attached to a corresponding second extremity of each leg such that in use of the supporting device, the plurality of feet abut against the wooden object for supporting, stabilizing and spacing the support plate relative to the wooden object. The support plate further defines a first slot and a second slot spaced from the first slot with each of the slots extending from the first face to the second face. An elongate flexible strap has a first termination and a second termination such that in use of the supporting device, the flexible strap extends through the first slot and the second slot of the support plate. A tensioning fastener attached to the flexible strap includes a first portion secured to the first termination of the flexible strap. A second portion is attached to the flexible strap between the second termination of the flexible strap and the first portion of the tensioning fastener. The arrangement is such that in use of the supporting device, the flexible strap loops around the wooden object and the first portion of the tensioning fastener cooperates with the second portion of the tensioning fastener for selectively tensioning the flexible strap. The flexible strap extending between the first slot and the second slot of the support plate is disposed between the support plate and the wooden object.

17 Claims, 13 Drawing Sheets

(56) References Cited

U.S. PATENT DOCUMENTS

| | | | | |
|---|---|---|---|---|
| 5,199,527 | A * | 4/1993 | Jennings | A01M 31/02 |
| | | | | 182/187 |
| 5,310,151 | A * | 5/1994 | Engel | F21V 21/08 |
| | | | | 248/230.8 |
| 5,482,241 | A * | 1/1996 | Oglesby | F41B 5/14 |
| | | | | 248/217.4 |
| 8,302,922 | B1 * | 11/2012 | Robinson | A47G 25/08 |
| | | | | 248/219.4 |
| 8,683,909 | B1 * | 4/2014 | Copus | F41A 23/16 |
| | | | | 182/127 |
| 10,465,842 | B1 * | 11/2019 | Garis | F16M 11/2021 |
| 10,883,655 | B1 * | 1/2021 | Rowton | F16M 11/105 |
| 2010/0040360 | A1 * | 2/2010 | Scott | F16M 11/2064 |
| | | | | 396/428 |
| 2013/0025178 | A1 * | 1/2013 | Blitch | F41A 23/02 |
| | | | | 42/94 |
| 2017/0160624 | A1 * | 6/2017 | Boushell | G03B 17/561 |
| 2020/0370707 | A1 * | 11/2020 | Palanisamy | F16B 2/08 |
| 2021/0080217 | A1 * | 3/2021 | Richards | F16M 13/022 |
| 2022/0260203 | A1 * | 8/2022 | Scott | A47B 5/02 |

\* cited by examiner

SUPPORT DEVICE FOR THE REMOVABLE ATTACHMENT THEREOF TO A WOODEN OBJECT

BACKGROUND OF THE INVENTION

Field of the Invention

The present invention relates to a supporting device for the removable attachment thereof to a wooden object such as a tree trunk.

More specifically, the present invention relates to a supporting device for the removable attachment thereof to a wooden object such as a tree trunk that avoids the insertion into the wooden object of a metallic fastener that could later damage machinery used while processing the wooden object.

Background Information

Various Federal and State laws forbid the attachment of equipment to trees trunks by nails or similar fasteners. The primary reason for the provision of these laws is to avoid damage to machinery subsequently used to process such trees. More specifically, if the tree is later processed by a chipper or debarking or similar machine, a metal fastener embedded in the tree would likely damage or destroy the machine. Such legislation is enacted so that when a tree is cut down, no nails are embedded in the tree that may damage or destroy tree cutting equipment such as chain saws. These nails and other metal fasteners also pose a potentially lethal hazard to the operator of a tree felling or sawing machine such as a chain saw.

The present invention overcomes the aforementioned problem, by the provision of an easily installed arrangement that does not require the insertion of any nails or fasteners into the tree trunk or branches of the tree or any wooden structure to which equipment is to be hung.

Basically, the present invention includes a strap looped around the tree trunk and anchored to a support plate so that when the ends of the strap are ratcheted tight around the tree, plastic feet extending from the support plate press against the tree trunk to stabilize and support the plate without damaging the tree trunk and do not leave anything metallic attached to or embedded in the tree after the removal of the supporting device from the tree.

The present invention also provides a simple device for removably attaching temporary signs such as warning signs to posts and trees during military exercises and the like.

Additionally, the present invention provides a removable anchorage for a hunting tree stand or the like. In this hunting stand application of the present invention, the support plate is provided with an eye hook arrangement for attachment to a safety harness with a 500 lb capacity. Unfortunately, every year, there are many reports of hunters falling out of poorly constructed tree stands and of climbers falling from broken ladders while climbing to or from tree stands. Often, such accidents end up with the hunter having a broken back resulting in confinement to a wheelchair. Sometimes such accidents can be fatal.

Additionally, there is a tendency for hunters to construct makeshift tree stands and ladders with the rungs of the ladder being nailed to the tree. However, as noted hereinbefore, most States in the United States of America have now passed legislation which makes it illegal to drive nails into trees.

The supporting device according to the present invention finds numerous applications including but not limited to, the support of one or more of the following equipment. Bird nesting houses or feeders. The support of the uppermost part of a step ladder, the mounting of a still or movie camera for taking shots of wildlife. The support of a hunter's stand. A support for a hunting bow which is ready at a moment's notice for use by a bow hunter. The supporting device according to the present invention may also be used for supporting a temporary camping bathroom from any suitably disposed tree. Additionally, the supporting device can be used for mounting a fairly large water container used for containing solar heated water which can be gravity fed through a valved shower head.

However, although the supporting device of the present invention finds numerous useful applications thereof, the primary feature of the present invention is the provision of a sturdy supporting device that is easily and releasably secured to a tree trunk or the like. This is achieved without requiring any nailing, bolting or screwing of the supporting device to the tree thereby overcoming the considerable and unlawful damage of trees caused by such insertion of nails, bolts and screws into the tree trunk or branches thereof with the attendant damage to machinery subsequently used to harvest such trees.

The supporting device according to the present invention is selectively releasable from the tree and is adjustable so that it can be used at different locations without damaging the tree. Also, the device is strong and safe for fully supporting the weight of a hunter and any equipment used by the hunter to make the tree stand more comfortable and operational. Such equipment might include a seat firmly secured to the tree stand and a framework for camouflaging the hunter while waiting for prey to come into sight.

Therefore, it is a primary feature of the present invention to provide a supporting device that overcomes the problems associated with the prior art arrangements.

Also, another feature of the present invention is the provision of a supporting device that stops the unlawful nailing of supporting devices to tree trunks.

Another feature of the present invention is the provision of a supporting device that is very strong and safe to use.

A further feature of the present invention is the provision of a supporting device that will not damage a tree.

A yet further feature of the present invention is the provision of a supporting device that is capable of supporting signs and fire numbers and addresses for homes.

Other features and advantages of the present invention will be readily apparent to those skilled in the art by a consideration of the detailed description of a preferred embodiment of the present invention contained herein.

SUMMARY OF THE INVENTION

The present invention relates to a supporting device for the removable attachment thereof to a wooden object such as a tree trunk that avoids the insertion into the wooden object of a metallic fastener that could later damage machinery used while processing the wooden object.

The supporting device includes a support plate having a first face and a second face and a first and a second edge. The support plate defines a plurality of apertures, each aperture of the plurality of apertures extending between the first and the second face of the support plate. A plurality of legs are provided with each leg having a first and a second extremity. Each leg threadably cooperates with a corresponding aperture of the plurality of apertures. A plurality of feet are provided with each foot being attached to a corresponding second extremity of each leg such that in use of the supporting device, the plurality of feet abut against the wooden object for supporting, stabilizing and spacing the support plate relative to the wooden object.

The support plate further defines a first slot and a second slot spaced from the first slot with each of the slots extending from the first face to the second face. An elongate flexible strap has a first termination and a second termination such that in use of the supporting device, the flexible strap extends through the first slot and the second slot of the support plate.

A tensioning fastener attached to the flexible strap includes a first portion which is secured to the first termination of the flexible strap. A second portion of the tensioning fastener is attached to the flexible strap between the second termination of the flexible strap and the first portion of the tensioning fastener. The arrangement is such that in use of the supporting device, the flexible strap loops around the wooden object and the first portion of the tensioning fastener cooperates with the second portion of the tensioning fastener for selectively tensioning the flexible strap. The arrangement is such that the flexible strap extending between the first slot and the second slot of the support plate is disposed between the support plate and the wooden object.

In a more specific embodiment of the present invention, the support plate is fabricated from steel.

Also, the second face of the support plate is disposed between the first face and the wooden object in use of the supporting device.

Moreover, the support plate has a third and fourth edge and is of rectangular configuration.

The support plate defines a plurality of further apertures such that in use of the supporting device, the further apertures are used for supporting various objects.

These objects include any of the following or any other equipment such as a bird house or feeder, a tree ladder, a camera, a hunting stand, a hunting bow support, a camping bathroom and a solar heated water container for a camping bathroom.

Additionally, a secondary support cooperates with the support plate for supporting the various objects and a fastener extends through a corresponding further aperture of the plurality of further apertures for securing the secondary support to the support plate.

The further apertures also include an arcuate slot such that when the support device is secured to a non-vertically disposed wooden object such as a bent tree trunk or a tree branch, the secondary support is adjustably disposed such that the various objects secured by the secondary support are secured in a generally vertical disposition thereof.

Moreover, the arcuate slot is disposed between a center of curvature of the arcuate slot and the first slot.

Furthermore, another arcuate slot is disposed between a center of curvature of the another arcuate slot and the second slot.

Also, the support plate has a third and fourth edge and is of rectangular configuration.

A further arcuate slot is disposed between a center of curvature of the further arcuate slot and the fourth edge.

The feet are fabricated from a plastics material such that the feet engage but do not damage the wooden object.

Also, the first slot is disposed closely adjacent to the first edge of the support plate and the second slot is disposed closely adjacent to the second edge of the support plate. The arrangement is such that a juncture of the first edge and the first face of the support plate defines a first chamfer in a vicinity of the first slot for inhibiting any possibility of the support plate cutting into the flexible strap;

Furthermore, a further juncture of the second edge and the first face of the support plate defines a second chamfer in a vicinity of the second slot for inhibiting any possibility of the support plate cutting into the flexible strap.

Additionally, each first extremity of each leg defines a head such that in use of the supporting device, rotation of the head adjusts a distance between a corresponding foot relative to the support plate for permitting adjustable movement of the support plate relative to the wooden object. The arrangement is such that once the tensioning fastener is tensioned, further tensioning of the elongate flexible strap is permitted by rotation of the head relative to the support plate.

The tensioning fastener is a ratchet type fastener which permits an adjustable increase in tension of the elongate flexible strap.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

BRIEF DESCRIPTION OF THE DRAWINGS

Similar reference characters refer to similar parts throughout the various views of the drawings.

DETAILED DESCRIPTION OF THE DRAWINGS

Figure 1:
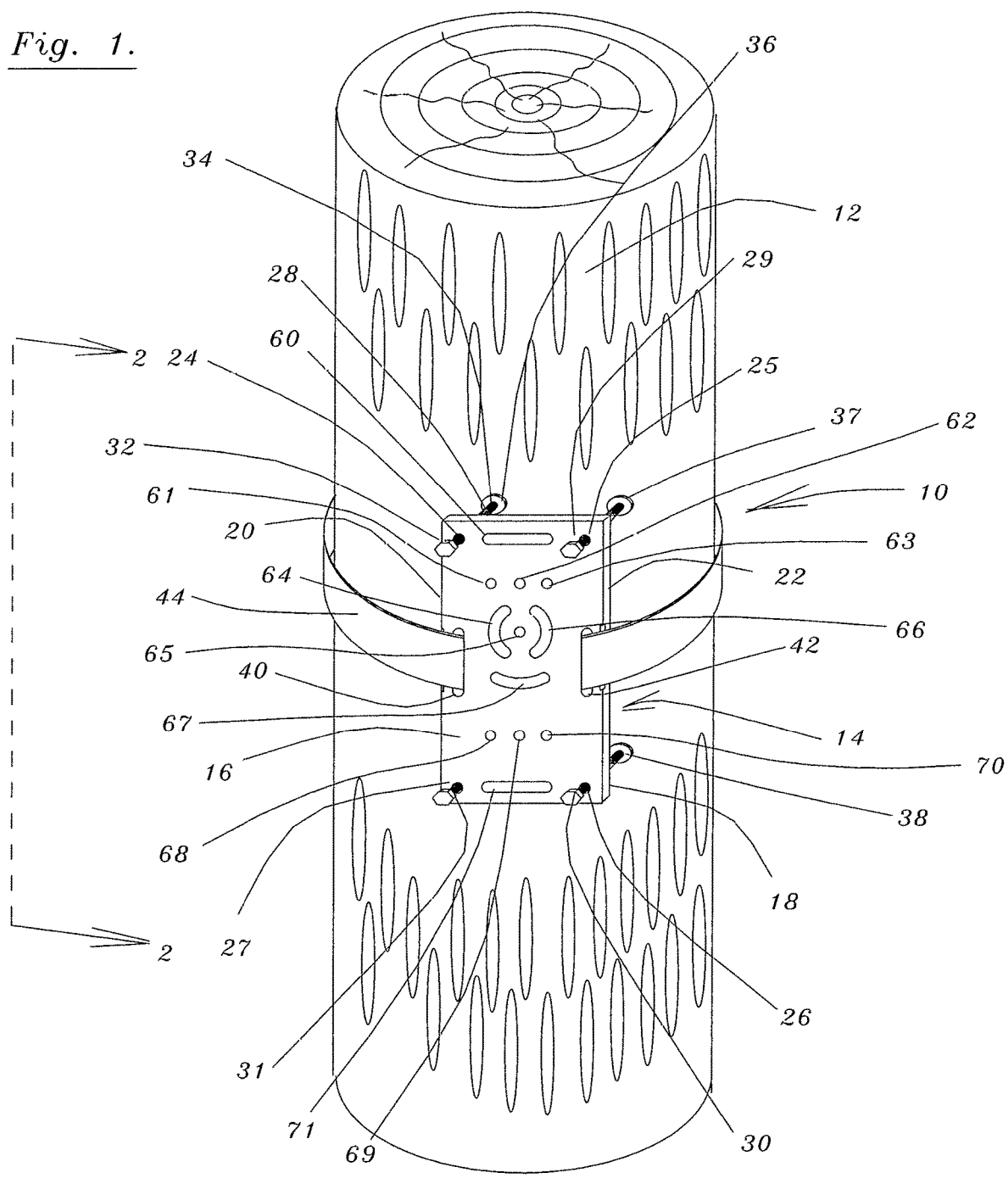
FIG. 1 is a perspective view of a supporting device according to the present invention.

FIG. 1 is a perspective view of a supporting device generally designated 10 according to the present invention.

As shown in FIG. 1, the supporting device 10 is used for the removable attachment thereof to a wooden object 12 such as a tree trunk that avoids the insertion into the wooden object 12 of a metallic fastener that could later damage machinery used while processing the wooden object 12. The supporting device 10 includes a support plate generally designated 14 having a first face 16 and a second face 18 and a first edge 20 and a second edge 22. The support plate 14 defines a plurality of apertures 24, 25, 26 and 27. Each aperture such as aperture 24 of the plurality of apertures 24 to 27 extends between the first face 16 and the second face 18 of the support plate 14. A plurality of legs 28, 29, 30 and 31 are provided with each leg such as leg 28 having a first extremity 32 and a second extremity 34. Each leg such as leg 28 threadably cooperates with a corresponding aperture 24 of the plurality of apertures 24 to 27.

Figure 2:
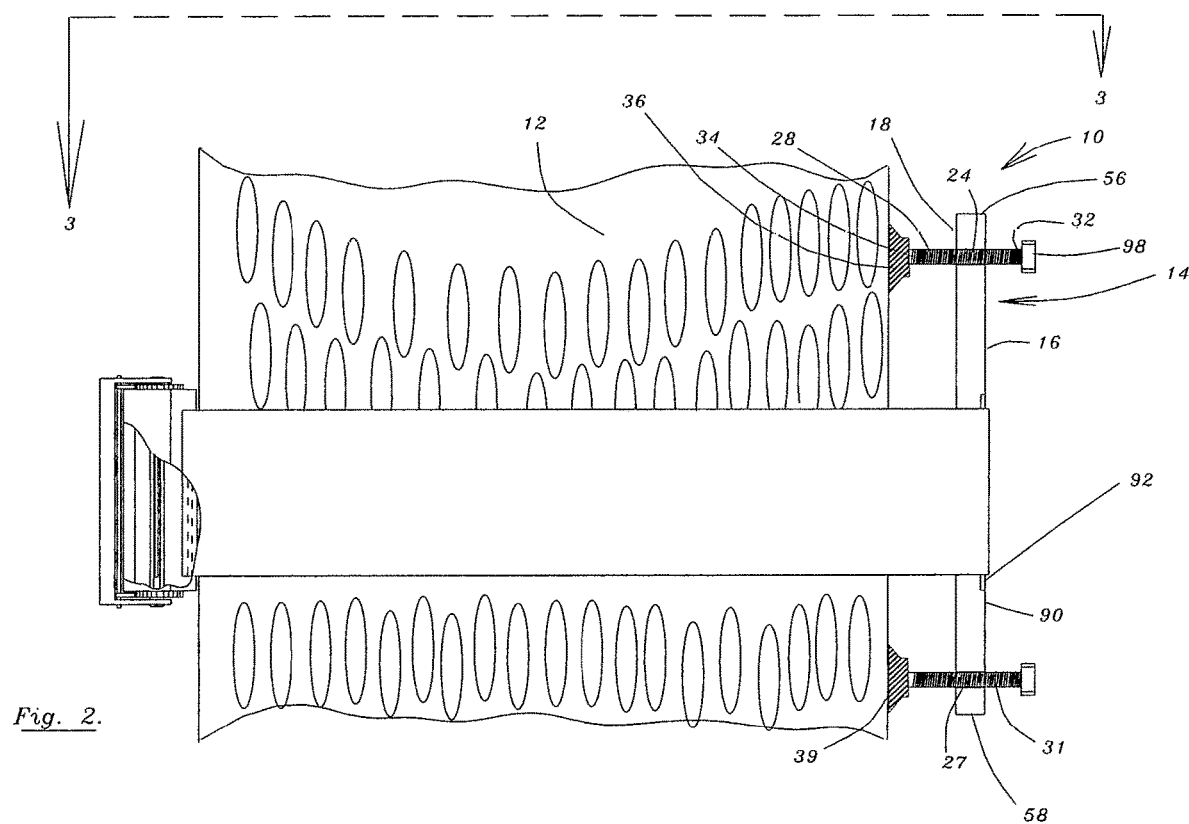
FIG. 2 is an enlarged view, partially in section, taken on the line 2-2 of FIG. 1.

FIG. 2 is an enlarged view, partially in section, taken on the line 2-2 of FIG. 1. As shown in FIG. 2, a plurality of feet 36, 37, 38 and 39 are provided with each foot such as foot 36 being attached to a corresponding second extremity 34 of each leg such as leg 28. The arrangement is such that in use of the supporting device 10, the plurality of feet 36 to 39 abut against the wooden object 12 for supporting, stabilizing and spacing the support plate 14 relative to the wooden object 12.

As shown in FIG. 1, the support plate 14 further defines a first slot 40 and a second slot 42 spaced from the first slot 40 with each of the slots 40 and 42 extending from the first face 16 to the second face 18.

Figure 3:
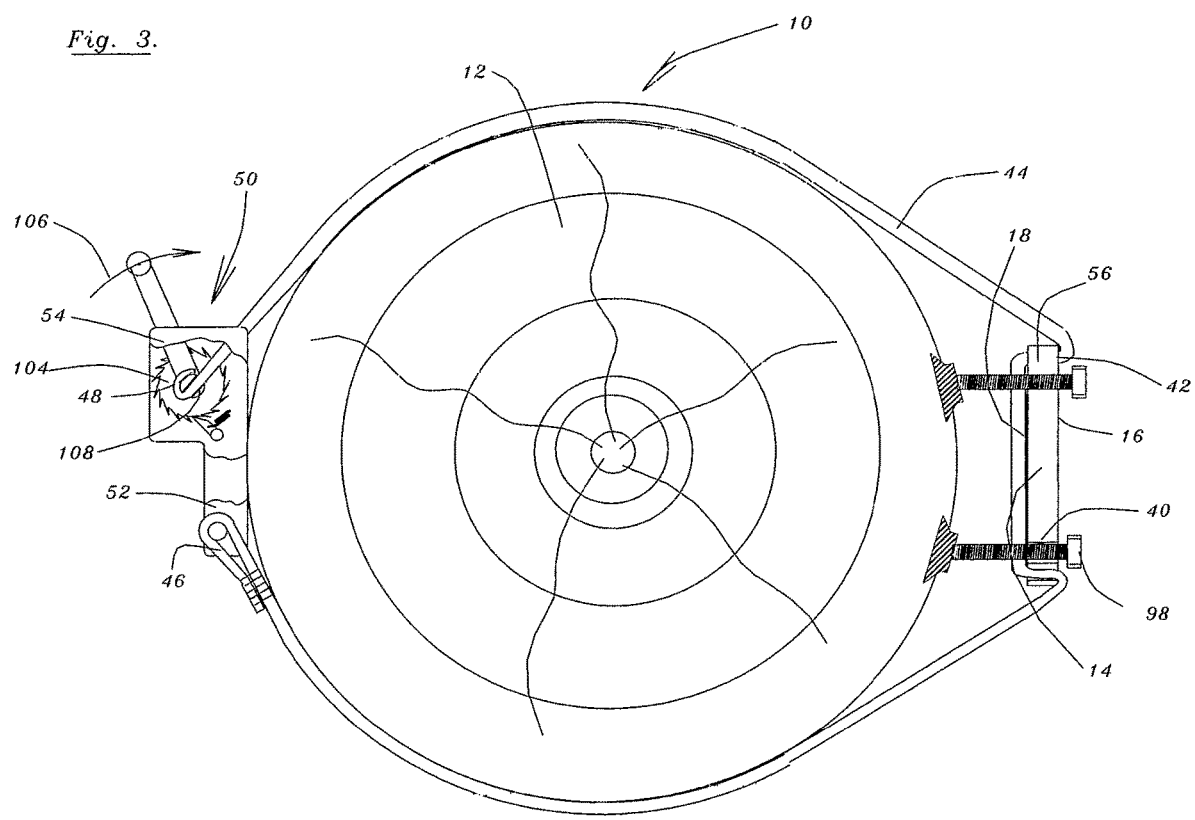
FIG. 3 is a view taken on the line 3-3 of FIG. 2.

FIG. 3 is a view taken on the line 3-3 of FIG. 2. As shown in FIG. 3, an elongate flexible strap generally designated 44 has a first termination 46 and a second termination 48. The arrangement is such that in use of the supporting device 10, the flexible strap 44 extends through the first slot 40 and the second slot 42 of the support plate 14. A tensioning fastener generally designated 50 is attached to the flexible strap 44 and includes a first portion 52 secured to the first termination 46 of the flexible strap 44. A second portion 54 of the tensioning fastener 50 is attached to the flexible strap 44 between the second termination 48 of the flexible strap 44 and the first portion 52 of the tensioning fastener 50. The arrangement is such that in use of the supporting device 10, the flexible strap 44 loops around the wooden object 12 such as a tree trunk as shown in FIG. 1. The first portion 52 of the tensioning fastener 50 cooperates with the second portion 54 of the tensioning fastener 50 for selectively tensioning the flexible strap 44. The arrangement is such that in use of the device 10, the flexible strap 44 extending between the first slot 40 and the second slot 42 of the support plate 14 is disposed between the support plate 14 and the wooden object 12.

In a more specific embodiment of the present invention, the support plate 14 is fabricated from steel.

Also, the second face 18 of the support plate 14 is disposed between the first face 16 and the wooden object 12 in use of the supporting device 10.

Moreover, the support plate 14 has a third and fourth edge 56 and 58 respectively and is of rectangular configuration.

As shown in FIG. 1, the support plate 14 defines a plurality of further apertures 60, 61, 62, 63, 64, 65, 66, 67, 68, 69, 70 and 71 such that in use of the supporting device 10, the further apertures 60 to 71 are used for supporting various objects or pieces of equipment.

Figure 4:
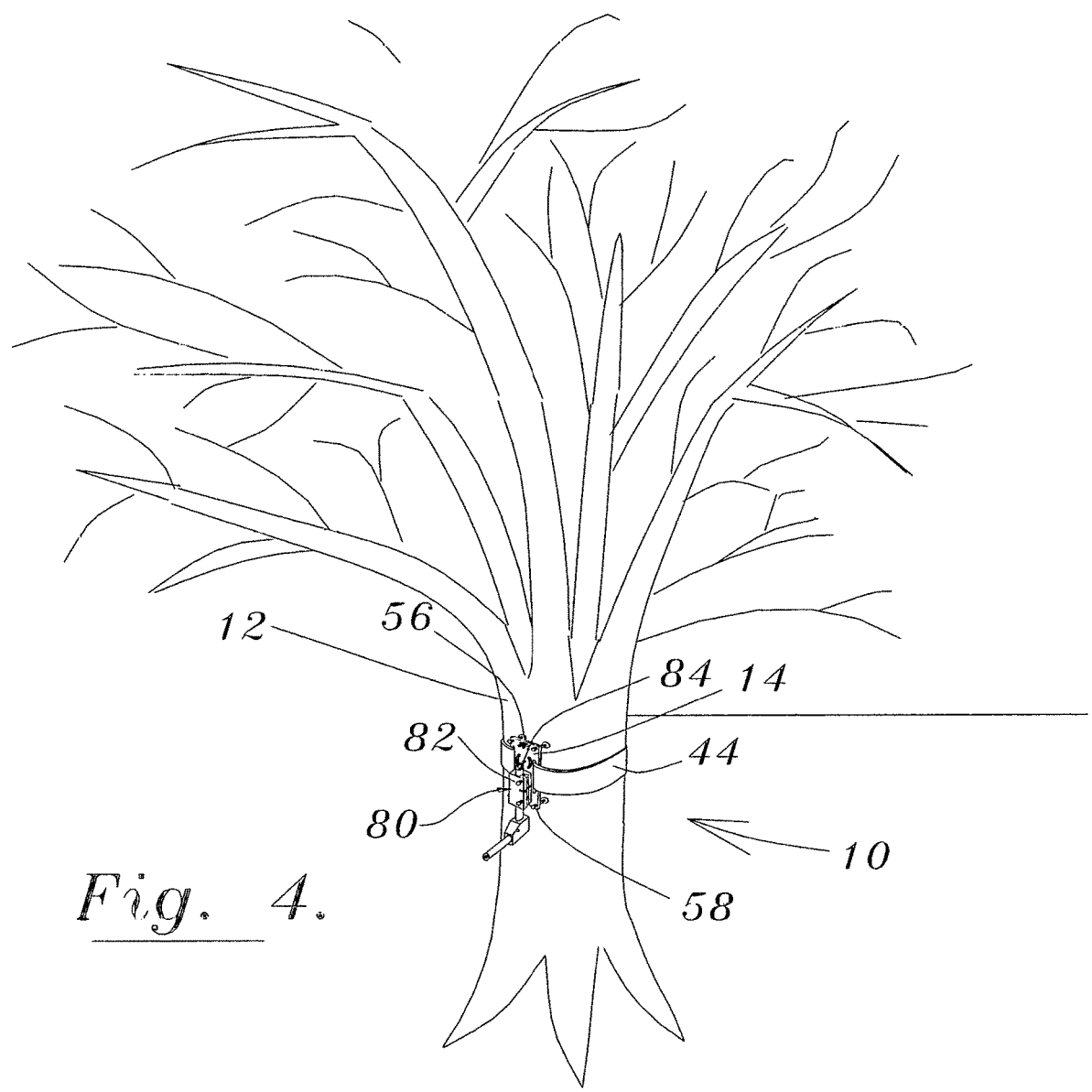
FIG. 4 is a perspective view of the support plate which is used for supporting a secondary support which in turn supports the various objects or pieces of equipment.

FIG. 4 is a perspective view of the support plate 14 which is used for supporting a secondary support 80 which in turn supports the various objects or pieces of equipment.

Figure 5:
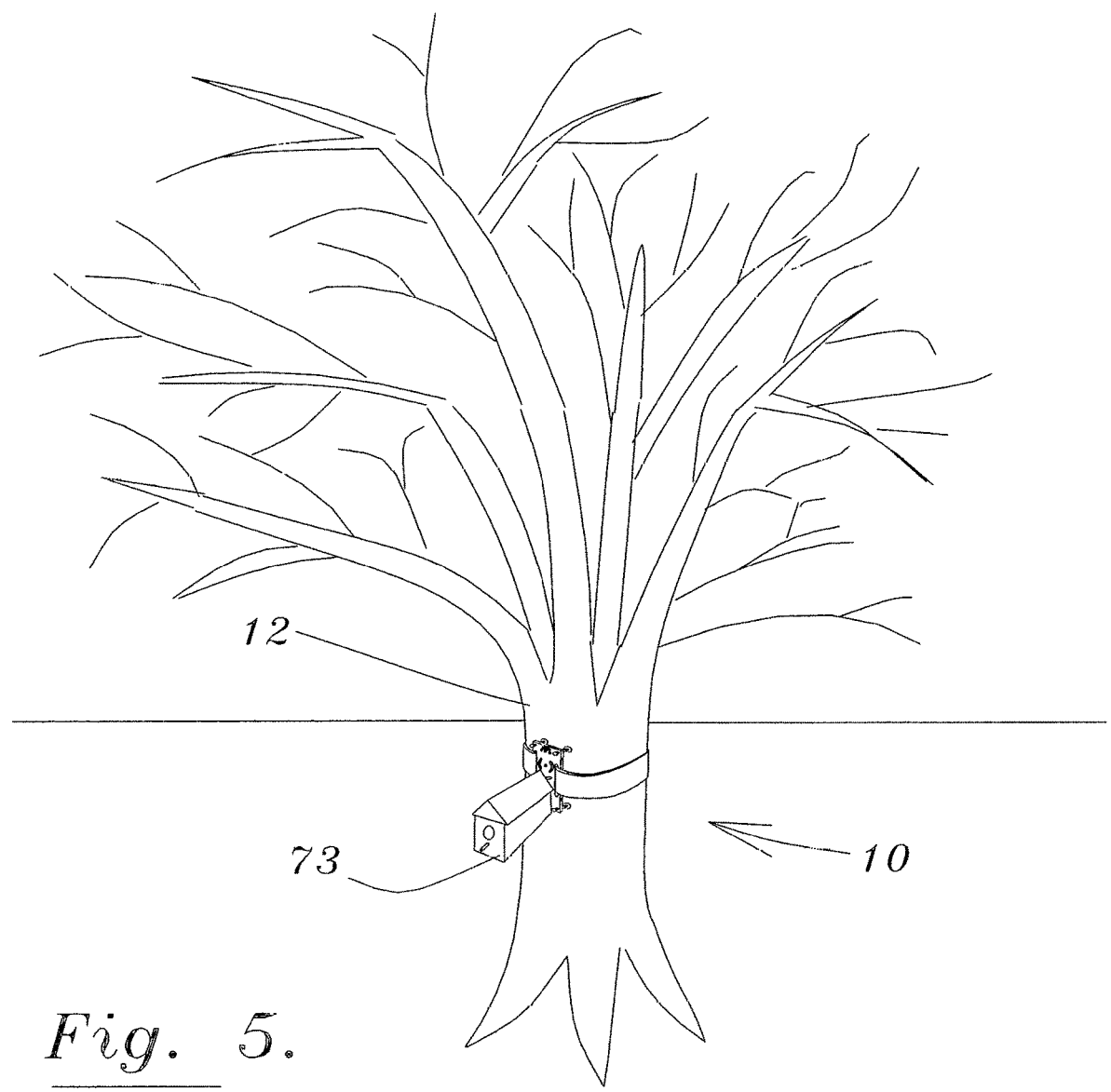
FIG. 5 is a perspective view similar to that shown in FIG. 4 but showing the secondary support supporting a bird house or feeder.

FIG. 5 is a perspective view similar to that shown in FIG. 4 but shows the secondary support 80 supporting a bird house or feeder 73.

Figure 6:
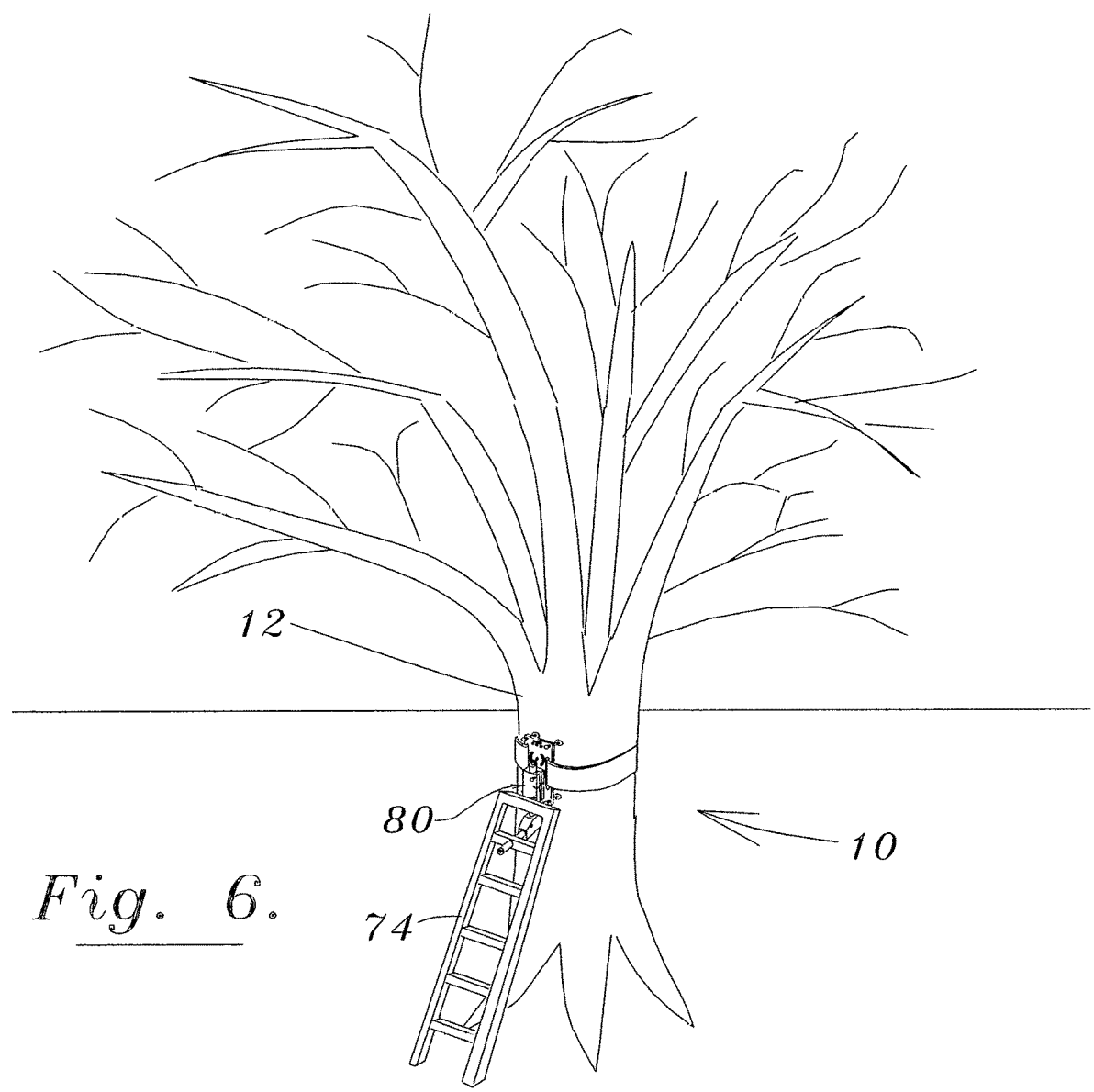
FIG. 6 is a perspective view similar to that shown in FIG. 4 but showing the secondary support supporting a tree ladder.

FIG. 6 is a perspective view similar to that shown in FIG. 4 but shows the secondary support 80 supporting a tree ladder 74.

Figure 7:
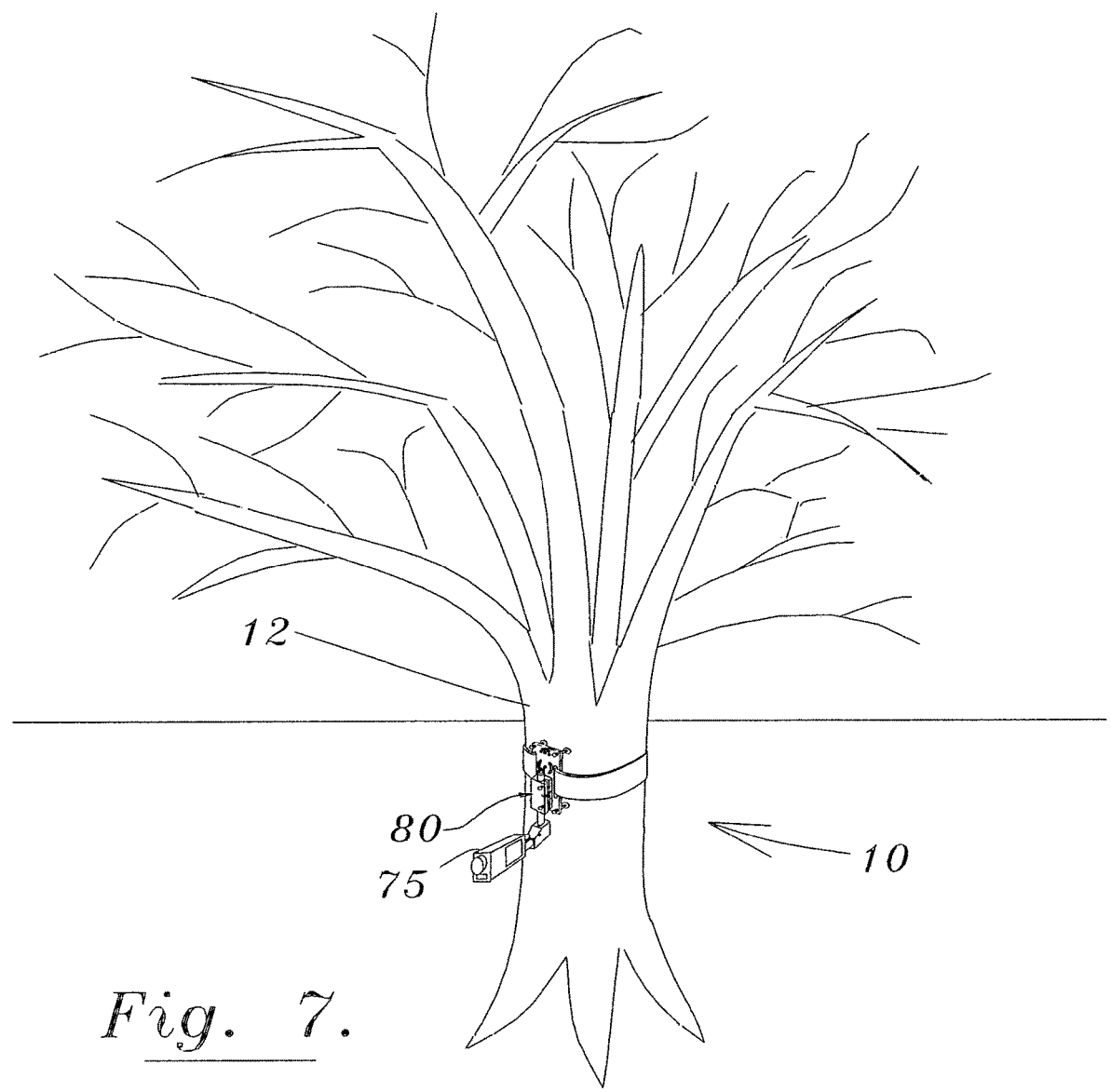
FIG. 7 is a perspective view similar to that shown in FIG. 4 but showing the secondary support supporting a camera.

FIG. 7 is a perspective view similar to that shown in FIG. 4 but shows the secondary support 80 supporting a camera 75.

Figure 8:
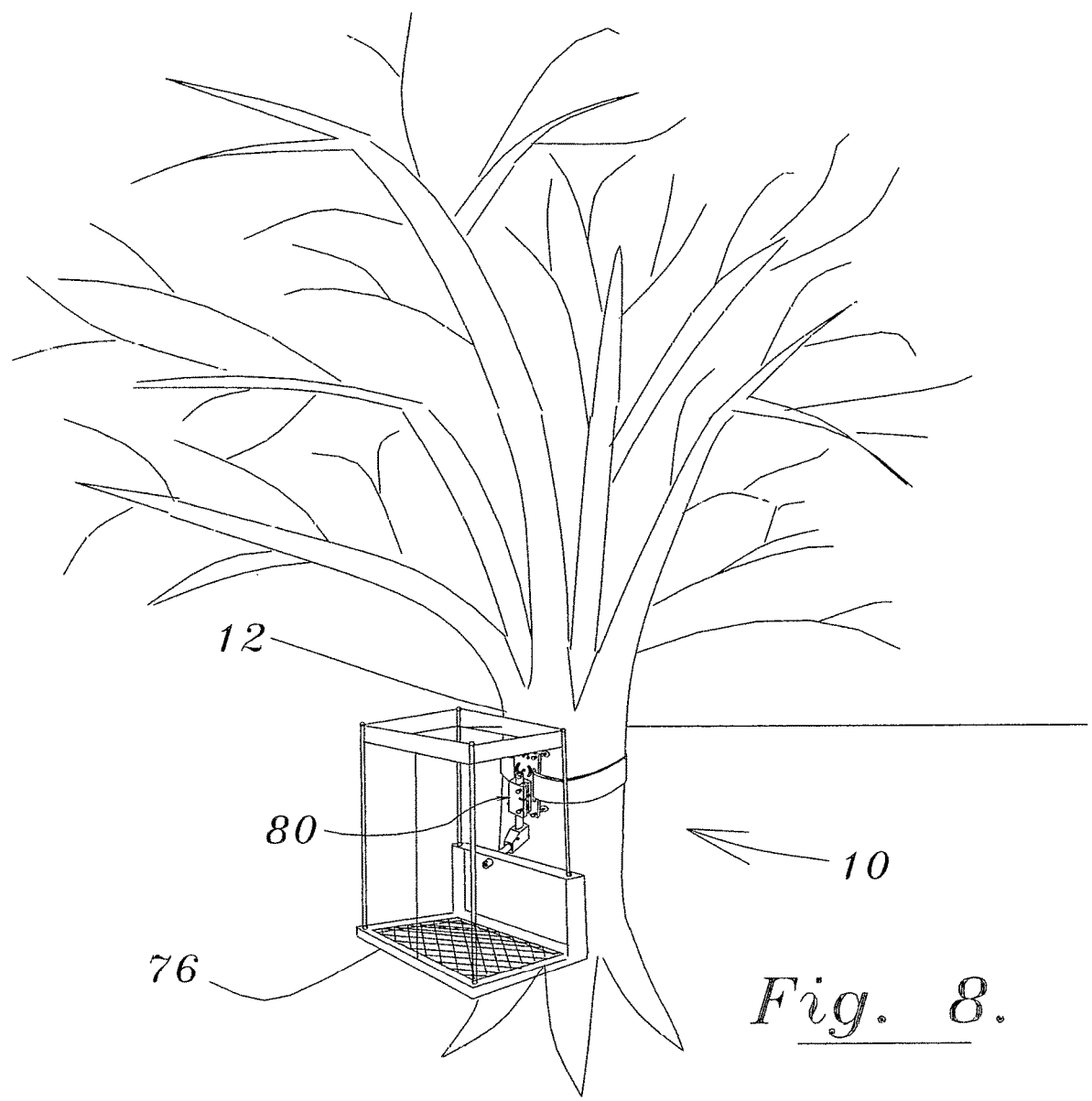
FIG. 8 is a perspective view similar to that shown in FIG. 4 but showing the secondary support supporting a hunting stand.

FIG. 8 is a perspective view similar to that shown in FIG. 4 but shows the secondary support 80 supporting a hunting stand 76. As shown in FIG. 8, a safety eye hook is threadably anchored to the support plate 14 so that a safety harness (not shown) may be worn by a hunter and attached by a safety rope to the eye hook. The safety hook has a 500 lb loading certification.

Figure 9:
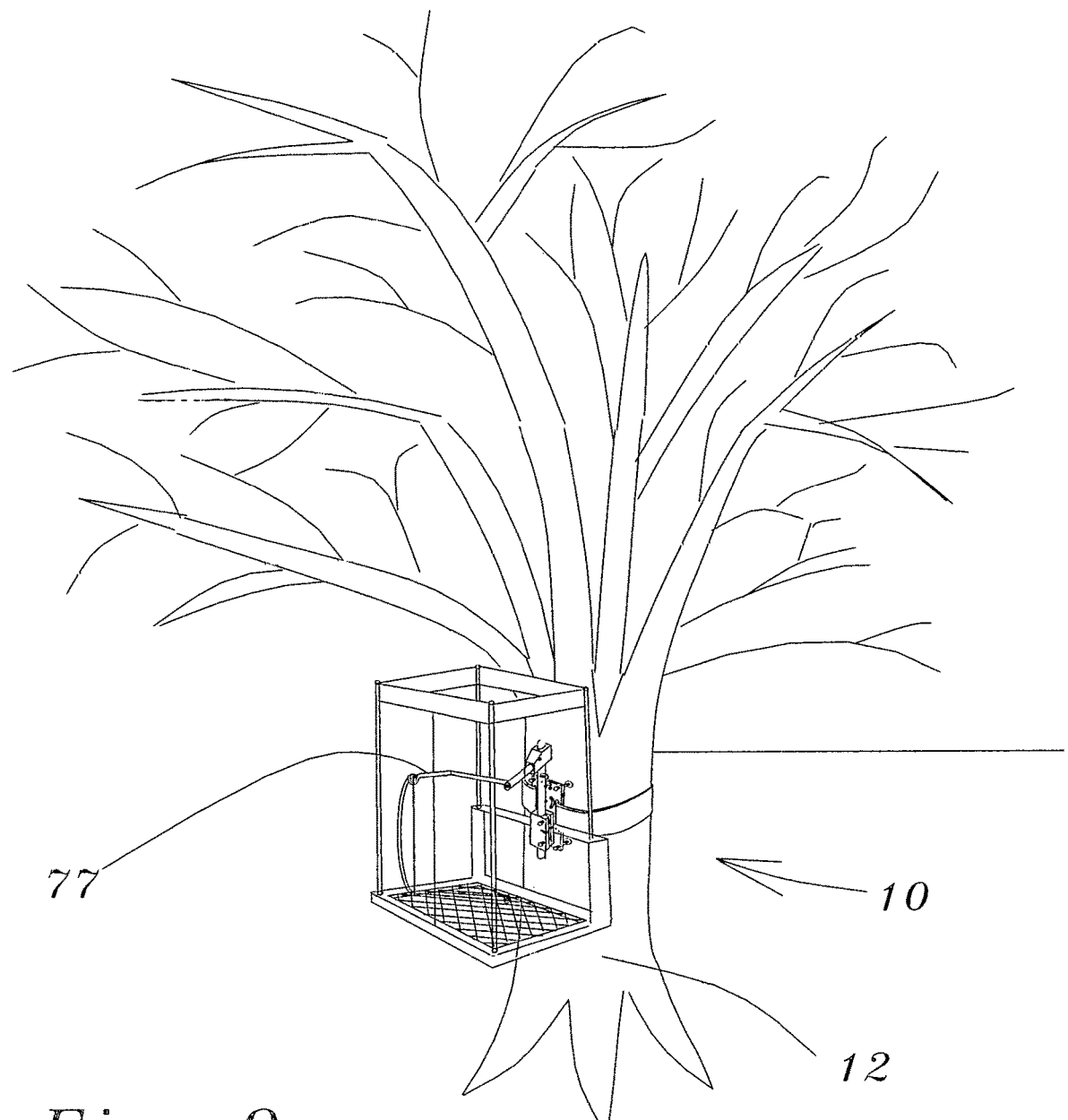
FIG. 9 is a perspective view similar to that shown in FIG. 4 but showing the secondary support supporting a hunting bow support.

FIG. 9 is a perspective view similar to that shown in FIG. 4 but shows the secondary support 80 supporting a hunting bow support 77.

Figure 10:
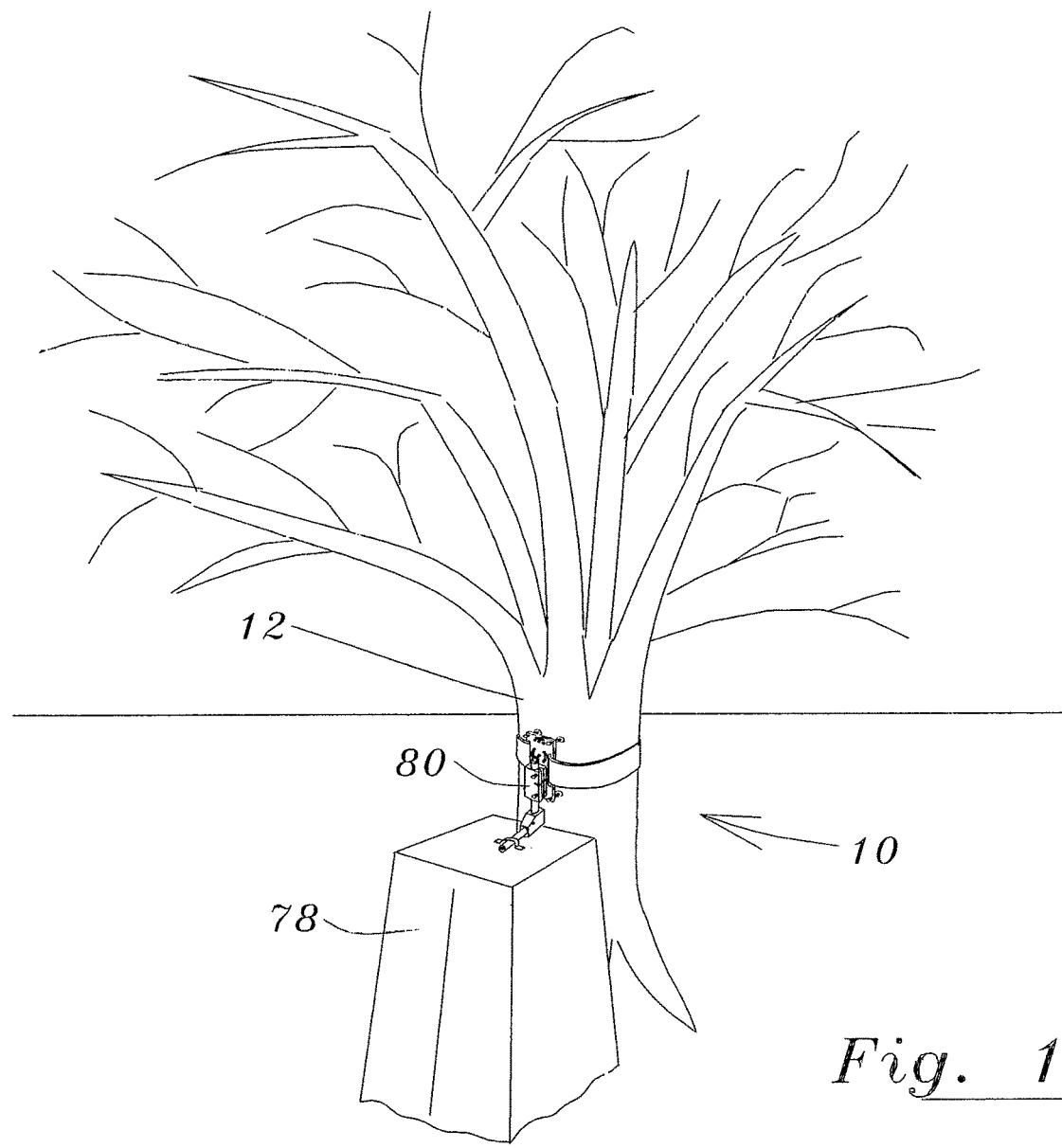
FIG. 10 is a perspective view similar to that shown in FIG. 4 but showing the secondary support supporting camping bathroom/shower enclosures.

FIG. 10 is a perspective view similar to that shown in FIG. 4 but shows the secondary support 80 supporting a camping bathroom/shower enclosure 78.

Figure 11:
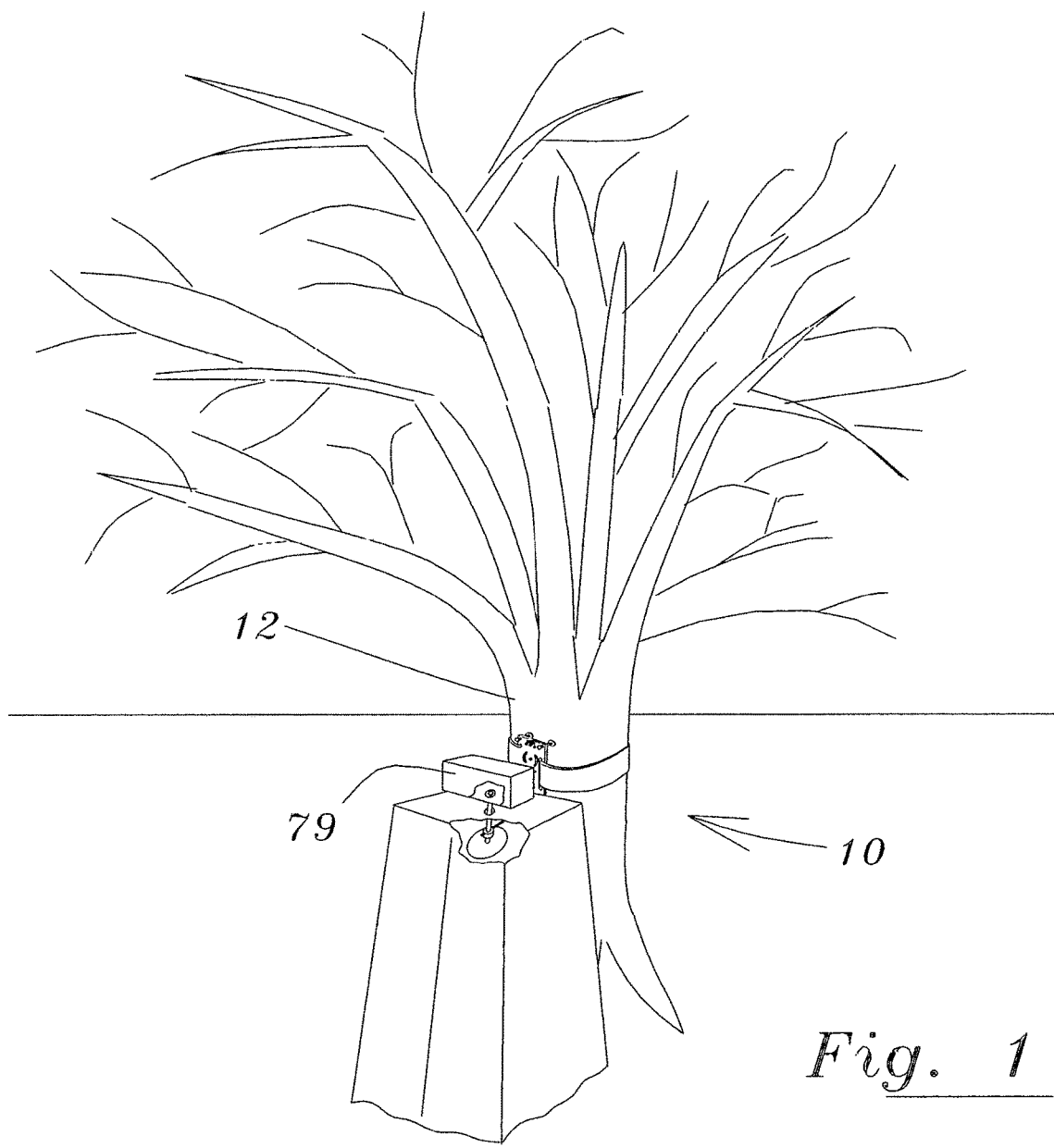
FIG. 11 is a perspective view similar to that shown in FIG. 4 but showing the secondary support supporting a solar heated water container for camping bathroom/shower enclosures.

FIG. 11 is a perspective view similar to that shown in FIG. 4 but shows the secondary support 80 supporting a solar heated water container 79 for a camping bathroom/shower enclosure 78.

The various objects and equipment 73 to 79 are given merely as examples of some of the uses to which the supporting device 10 according to the present invention can be applied. Those skilled in the art will appreciate that numerous other useful applications of the supporting device 10 are possible without departing from the spirit and scope of the present invention as claimed.

As shown in FIGS. 5 to 11, the secondary support 80 cooperates with the support plate 14 for supporting the various objects 73 to 79. Threaded fasteners 82 extend through corresponding further apertures of the plurality of further apertures 60 to 71 for securing the secondary support 80 to the support plate 14.

The further apertures 60 to 71 include an arcuate slot 64 such that when the support device 10 is secured to a non-vertically disposed wooden object 12 such as a bent tree trunk or a tree branch, the secondary support 80 is adjustably disposed and anchored to the support plate 14 such that the various objects 73 to 79 secured by the secondary support 80 are secured in a generally vertical disposition thereof.

Moreover, the arcuate slot 64 is disposed between a center of curvature 84 and the first slot 40.

Furthermore, the plurality of further apertures 60 to 71 includes another arcuate slot 68 which is disposed between a center of curvature 84 and the second slot 42.

Also, the support plate 14 has a third and fourth edge 86 and 88 respectively and is of rectangular configuration.

The plurality of further apertures 60 to 71 includes a further arcuate slot 69 which is disposed between a center of curvature 84 and the fourth edge 88.

Each of the plurality of feet 36 to 39 are fabricated from a plastics material such that the feet 36 to 39 engage but do not damage the wooden object 12. The feet 36 to 39 may be of different configurations in order to conform to the particular surface structure of the bark of the tree.

As shown in FIG. 3, the first slot 40 is disposed closely adjacent to the first edge 20 of the support plate 14 and the second slot 42 is disposed closely adjacent to the second edge 22 of the support plate 14. The arrangement is such that a juncture 90 of the first edge 20 and the first face 16 of the support plate 14 defines a first chamfer 92 disposed in a vicinity of the first slot 40 for inhibiting any possibility of the support plate 14 cutting into the flexible strap 44.

Figure 12:
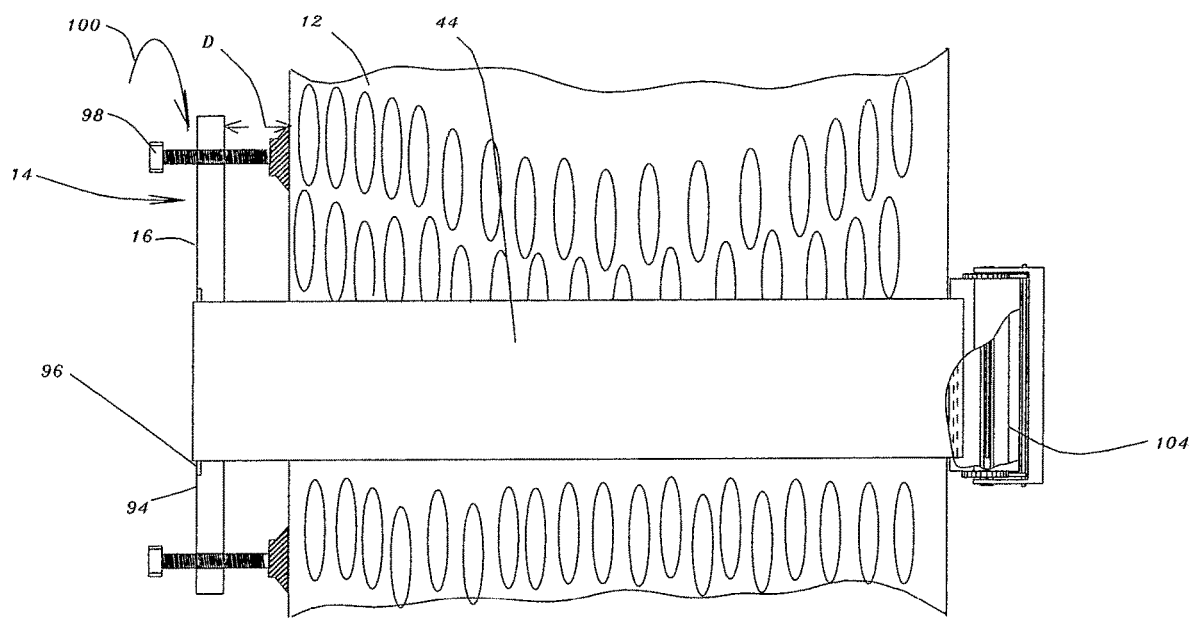
FIG. 12 is view taken on the line 12-12 of FIG. 3.

FIG. 12 is view taken on the line 12-12 of FIG. 3. As shown in FIG. 12, a further juncture 94 of the second edge 22 and the first face 16 of the support plate 14 defines a second chamfer 96 disposed in a vicinity of the second slot 42 for inhibiting any possibility of the support plate cutting into the flexible strap 44.

As shown in FIG. 3, each first extremity 32 of each leg such as leg 28 defines a head 98 having a hexagonal configuration such that in use of the supporting device 10, rotation of the head 98 as indicated by the arrow 100 adjusts a distance D between a corresponding foot 36 relative to the support plate 14 for permitting adjustable movement of the support plate 14 relative to the wooden object 12 as indicated by the arrow D. The arrangement is such that once the tensioning fastener 50 is tensioned, further tensioning of the elongate flexible strap 44 is permitted by rotation of the head 98 relative to the support plate 14.

The tensioning fastener 50 is a typical ratchet type fastener which permits an adjustable increase in tension of the elongate flexible strap 44. The first portion 52 and the second portion 54 of the ratchet type fastener 50 may form a single rigidly spaced unit. Alternatively, the first portion 52 and the second portion 54 of the ratchet type fastener 50 may be separate units so that they can be releasably connected to each other by a tongue and slot mechanism (not shown).

Moreover, the second portion 54 of the ratchet type tensioning fastener 50 includes a spool 104 and is connected to the first part 52 such that the spool 104 is rotatable relative to the first part 52 as indicated by the arrow 106. The spool 104 defines an elongate channel 108 for the reception therethrough of the second termination 48 of the flexible strap 44 such that when the spool 104 is rotated relative to the first part 52, tensioning of the flexible strap 44 is permitted.

Figure 13:
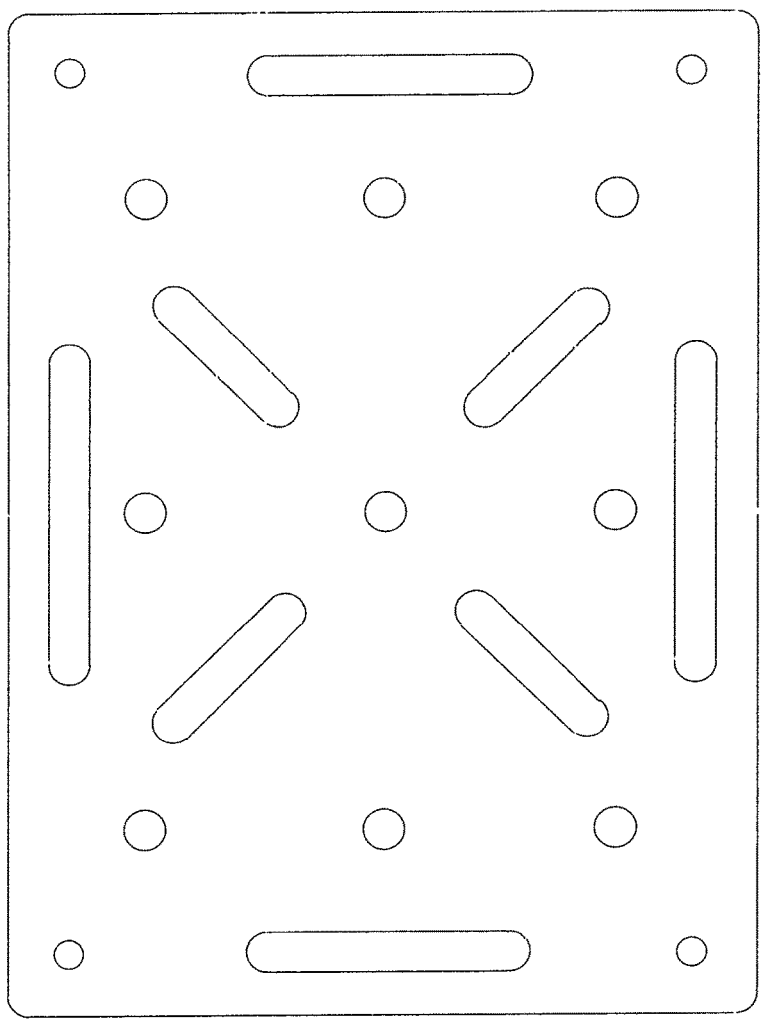
FIG. 13 is a front elevational view of an alternative type of support plate to the support plate shown in FIG. 4.

FIG. 13 is a front elevational view of an alternative type of support plate to the support plate 14 shown in FIG. 4. As shown in FIG. 13, the support plate 14a has a different configuration of holes and slots for supporting the various devices shown in FIGS. 5 to 11.

In operation of the supporting device 10 according to the present invention, the flexible strap 44 is threaded though the slots 40 and 42 so that the second face 18 of the support plate 14 is disposed between the flexible strap 44 extending between the slots 40 and 42 and the first face 16 of the support plate 14. After looping the flexible strap 44 around the tree trunk 12, the second termination 48 of the flexible strap 44 is the treaded through the elongate channel 108 of the spool 104 of the ratchet type tensioning fastener 50. The second termination 48 of the flexible strap 44 is then pulled so that the flexible strap 44 slides through the channel 108 until hand tight. The ratchet type tensioning fastener 50 is operated to ratchet and thus apply tension to the flexible strap 44 so that the feet 36 to 39 firmly press against the tree trunk 12. If necessary, even further tension can be applied by rotating the various head 98 to increase the distance D between the feet 36 to 39 and the support plate 14. With the support plate 14 firmly secured to the tree trunk, the secondary support 80 is anchored onto the support plate 14 by fasteners 82. Various configurations of the secondary support 80 are obtained by using a combination of any of the further apertures 60 to 71 in order to provide the required support for equipment such as 73 to 79 shown in FIGS. 5 to 11.

Many modifications and variations of the present invention will be readily apparent to those skilled in the art by a consideration of the detailed description contained hereinafter taken in conjunction with the annexed drawings which show a preferred embodiment of the present invention. However, such modifications and variations fall within the spirit and scope of the present invention as defined by the appended claims.

The present invention provides a unique supporting device that provides a very safe means for the user thereof to support numerous pieces of equipment to a tree trunk without the insertion of any nails, bolts or screws into the tree that would subsequently cause damage to any tree harvesting machinery.

What is claimed is:

1. A supporting device for the removable attachment thereof to a wooden object such as a tree trunk that avoids the insertion into the wooden object of a metallic fastener that could later damage machinery used while processing the wooden object, said supporting device comprising:
   a support plate having a first face and a second face and a first and a second edge, said support plate defining a plurality of apertures, each aperture of said plurality of apertures extending between said first and said second face of said support plate;
   a plurality of legs, each leg of said plurality of legs having a first and a second extremity, each leg threadably cooperating with a corresponding aperture of said plurality of apertures;
   a plurality of feet, each foot of said plurality of feet being attached to a corresponding second extremity of each leg of said plurality of legs such that in use of the supporting device, said plurality of feet abut against the wooden object for supporting, stabilizing and spacing the support plate relative to the wooden object;
   said support plate further defining a first slot and a second slot spaced from said first slot with each of said slots extending from said first face to said second face;
   an elongate flexible strap having a first termination and a second termination such that in use of the supporting device, said flexible strap extends through said first slot and said second slot of said support plate;
   a tensioning fastener attached to said flexible strap, said tensioning fastener including:
   a first portion secured to said first termination of said flexible strap; and
   a second portion attached to said flexible strap between said second termination of said flexible strap and said first portion of said tensioning fastener such that in use of the supporting device, said flexible strap loops around the wooden object and said first portion of said tensioning fastener cooperates with said second portion of said tensioning fastener for selectively tensioning said flexible strap, said flexible strap extending between said first slot and said second slot of said support plate being disposed between said support plate and the wooden object.

2. A supporting device for the removable attachment thereof to a wooden object as set forth in claim 1 wherein said support plate is fabricated from steel.

3. A supporting device for the removable attachment thereof to a wooden object as set forth in claim 1 wherein said second face is disposed between said first face and the wooden object in use of the supporting device.

4. A supporting device for the removable attachment thereof to a wooden object as set forth in claim 1 wherein said support plate has a third and fourth edge and is of rectangular configuration.

5. A supporting device for the removable attachment thereof to a wooden object as set forth in claim 1 wherein said support plate defines a plurality of further apertures such that in use of the supporting device, said further apertures are used for supporting various objects.

6. A supporting device for the removable attachment thereof to a wooden object as set forth in claim 5 wherein said various objects include:
at least one of the following:
a bird house;
a tree ladder;
a camera;
a hunting stand;
a hunting bow support;
a camping bathroom/shower enclosure;
a solar heated water container for a camping bathroom/shower enclosure.

7. A supporting device for the removable attachment thereof to a wooden object as set forth in claim 6 including:
a secondary support cooperating with said support plate for supporting said various objects;
a fastener extending through a corresponding further aperture of said plurality of further apertures for securing said secondary support to said support plate.

8. A supporting device for the removable attachment thereof to a wooden object as set forth in claim 7 wherein said further apertures include:
an arcuate slot such that when said support device is secured to a non-vertically disposed wooden object, said secondary support is adjustably disposed such that said various objects secured by said secondary support are secured in a vertical disposition thereof.

9. A supporting device for the removable attachment thereof to a wooden object as set forth in claim 8 wherein said arcuate slot is disposed between a center of curvature of said arcuate slot and said first slot.

10. A supporting device for the removable attachment thereof to a wooden object as set forth in claim 8 wherein another arcuate slot is disposed between a center of curvature of said another arcuate slot and said second slot.

11. A supporting device for the removable attachment thereof to a wooden object as set forth in claim 8 wherein said support plate has a third and fourth edge and is of rectangular configuration;
a further arcuate slot disposed between a center of curvature of said further arcuate slot and said fourth edge.

12. A supporting device for the removable attachment thereof to a wooden object as set forth in claim 1 wherein said feet are fabricated from a plastics material such that said feet engage but do not damage the wooden object.

13. A supporting device for the removable attachment thereof to a wooden object as set forth in claim 1 wherein said first slot is disposed closely adjacent to said first edge of said support plate;
said second slot is disposed closely adjacent to said second edge of said support plate;
a juncture of said first edge and said first face of said support plate defining a first chamfer disposed in a vicinity of said first slot for inhibiting any possibility of said support plate cutting into said flexible strap;
a further juncture of said second edge and said first face of said support plate defining a second chamfer disposed in a vicinity of said second slot for inhibiting any possibility of said support plate cutting into said flexible strap.

14. A supporting device for the removable attachment thereof to a wooden object as set forth in claim 1 wherein each first extremity of each leg defines a head such that in use of the supporting device, rotation of said head adjusts a distance between a corresponding foot relative to said support plate for permitting adjustable movement of said support plate relative to the wooden object such that once said tensioning fastener is tensioned, further tensioning of said elongate flexible strap is permitted by rotation of said head relative to said support plate.

15. A supporting device for the removable attachment thereof to a wooden object as set forth in claim 1 wherein said tensioning fastener is a ratchet type fastener which permits an adjustable increase in tension of said elongate flexible strap.

16. A supporting device for the removable attachment thereof to a wooden object such as a tree trunk that avoids the insertion into the wooden object of a metallic fastener that could later damage machinery used while processing the wooden object, said supporting device comprising:
a support plate having a first face and a second face and a first and a second edge, said support plate defining a plurality of apertures, each aperture of said plurality of apertures extending between said first and said second face of said support plate;
a plurality of legs, each leg of said plurality of legs having a first and a second extremity, each leg threadably cooperating with a corresponding aperture of said plurality of apertures;
a plurality of feet, each foot of said plurality of feet being attached to a corresponding second extremity of each leg of said plurality of legs such that in use of the supporting device, said plurality of feet abut against the wooden object for supporting, stabilizing and spacing the support plate relative to the wooden object;
said support plate further defining a first slot and a second slot spaced from said first slot with each of said slots extending from said first face to said second face;
an elongate flexible strap having a first termination and a second termination such that in use of the supporting device, said flexible strap extends through said first slot and said second slot of said support plate;
a ratchet type tensioning fastener attached to said flexible strap, said tensioning fastener including:
a first portion secured to said first termination of said flexible strap;
a second portion attached to said flexible strap between said second termination of said flexible strap and said first portion of said tensioning fastener such that in use of the supporting device, said flexible strap loops around the wooden object and said first portion of said tensioning fastener cooperates with said second portion of said tensioning fastener for selectively tensioning said flexible strap, said flexible strap extending between said first slot and said second slot of said support plate being disposed between said support plate and the wooden object; and
said second portion of said ratchet type tensioning fastener including:
a spool connected to said first portion such that said spool is rotatable relative to said first portion, said spool defining an elongate channel for the reception therethrough of said second termination of said flexible strap such that when said spool is rotated relative to said first portion, tensioning of said flexible strap is permitted.

17. A supporting device for the removable attachment thereof to a wooden object such as a tree trunk that avoids the insertion into the wooden object of a metallic fastener that could later damage machinery used while processing the wooden object, said supporting device comprising:

a support plate having a first face and a second face and a first and a second edge, said support plate defining a plurality of apertures, each aperture of said plurality of apertures extending between said first and said second face of said support plate;

a plurality of legs, each leg of said plurality of legs having a first and a second extremity, each leg threadably cooperating with a corresponding aperture of said plurality of apertures;

a plurality of feet, each foot of said plurality of feet being attached to a corresponding second extremity of each leg of said plurality of legs such that in use of the supporting device, said plurality of feet abut against the wooden object for supporting, stabilizing and spacing the support plate relative to the wooden object;

said support plate further defining a first slot and a second slot spaced from said first slot with each of said slots extending from said first face to said second face;

an elongate flexible strap having a first termination and a second termination such that in use of the supporting device, said flexible strap extends through said first slot and said second slot of said support plate;

a tensioning fastener attached to said flexible strap, said tensioning fastener including:

a first portion secured to said first termination of said flexible strap;

a second portion attached to said flexible strap between said second termination of said flexible strap and said first portion of said tensioning fastener such that in use of the supporting device, said flexible strap loops around the wooden object and said first portion of said tensioning fastener cooperates with said second portion of said tensioning fastener for selectively tensioning said flexible strap, said flexible strap extending between said first slot and said second slot of said support plate being disposed between said support plate and the wooden object;

said support plate is fabricated from steel;

said second face is disposed between said first face and the wooden object in use of the supporting device;

said support plate has a third and fourth edge and is of rectangular configuration;

said support plate defines a plurality of further apertures such that in use of the supporting device, said further apertures are used for supporting various objects;

said various objects include at least one of the following:
a bird house;
a tree ladder;
a camera;
a hunting stand;
a hunting bow support;
a camping bathroom/shower enclosure;
a solar heated water container for a camping bathroom/shower enclosure;
a secondary support cooperating with said support plate for supporting said various objects;
a fastener extending through a corresponding further aperture of said plurality of further apertures for securing said secondary support to said support plate;
said further apertures include:
an arcuate slot such that when said support device is secured to a non-vertically disposed wooden object, said secondary support is adjustably disposed such that said various objects secured by said secondary support are secured in a vertical disposition thereof;
said arcuate slot is disposed between a center of curvature of said arcuate slot and said first slot;
another arcuate slot disposed between said center of curvature of said another arcuate slot and said second slot;
said support plate has a third and fourth edge and is of rectangular configuration;
a further arcuate slot disposed between said center of curvature of said further arcuate slot and said fourth edge;
said feet are fabricated from a plastics material such that said feet engage but do not damage the wooden object;
said first slot is disposed closely adjacent to said first edge of said support plate;
said second slot is disposed closely adjacent to said second edge of said support plate;
a juncture of said first edge and said first face of said support plate defining a first chamfer in a vicinity of said first slot for inhibiting any possibility of said support plate cutting into said flexible strap;
a further juncture of said second edge and said first face of said support plate defining a second chamfer in a vicinity of said second slot for inhibiting any possibility of said support plate cutting into said flexible strap;
each first extremity of each leg defining a head such that in use of the supporting device rotation of said head adjusts a distance between a corresponding foot relative to said support plate for permitting adjustable movement of said support plate relative to the wooden object such that once said tensioning fastener is fastened, further tensioning of said elongate flexible strap is permitted by rotation of said heads relative to said support plate; and
said tensioning fastener is a ratchet type fastener which permits an adjustable increase in tension of said elongate flexible strap.

* * * * *